United States Patent [19]

Hammer et al.

[11] Patent Number: 4,797,237
[45] Date of Patent: Jan. 10, 1989

[54] METHOD FOR RECYCLING A BEVERAGE CONTAINER

[75] Inventors: Floyd V. Hammer, R.R. 1, Union, Iowa 50258; Brian Harper, Havant, United Kingdom

[73] Assignee: Floyd V. Hammer, Union, Iowa

[21] Appl. No.: 45,387

[22] Filed: May 4, 1987

[51] Int. Cl.⁴ ............... B29C 33/34; B29C 47/38; B29C 47/60
[52] U.S. Cl. .................... 264/45.3; 264/37; 264/140; 264/211; 264/211.21; 264/328.17; 264/328.18; 264/DIG. 69
[58] Field of Search .............. 264/140, DIG. 69, 37, 264/45.3, 211, 211.21, 328.17, 328.18

[56] References Cited

U.S. PATENT DOCUMENTS

| | | | |
|---|---|---|---|
| 4,138,534 | 2/1979 | Tedesco | 264/45.3 X |
| 4,177,234 | 12/1979 | Lowry | 264/37 |
| 4,187,352 | 2/1980 | Klobbie | 264/DIG. 69 |
| 4,493,806 | 1/1985 | Hatzikelis et al. | 264/140 |
| 4,701,370 | 10/1987 | Park | 264/210.7 |

FOREIGN PATENT DOCUMENTS

| | | | |
|---|---|---|---|
| 0149635 | 7/1981 | Fed. Rep. of Germany | 264/140 |
| 2305286 | 10/1976 | France | 264/DIG. 69 |
| 49-47271 | 12/1974 | Japan | 264/140 |
| 57-31529 | 2/1982 | Japan | 264/140 |
| 1595431 | 8/1981 | United Kingdom | 264/37 |

*Primary Examiner*—Jan H. Silbaugh
*Assistant Examiner*—Leo B. Tentoni
*Attorney, Agent, or Firm*—Zarley, McKee, Thomte, Voorhees & Sease

[57] ABSTRACT

A product is made by recycling a beverage container comprising a PET (polyethylene terephthalate) body having a plastic base cup and a metal cap attached thereto. The base cup is made form a plastic material different from the PET. The method includes grinding the entire beverage container including the PET body, the metal cap and the base cup, into particles sufficiently small to flow into a plastics molding machine. The ground particles are fed into a molding machine which heats and applies pressure to them and forces them into a mold of predetermined shape. The molded material is then cooled whereby the molded material hardens and forms a solid object having the predetermined shape of the mold.

11 Claims, 1 Drawing Sheet

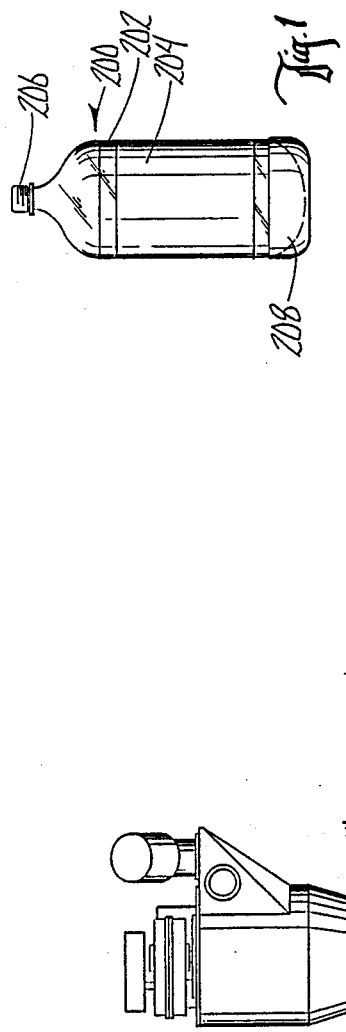
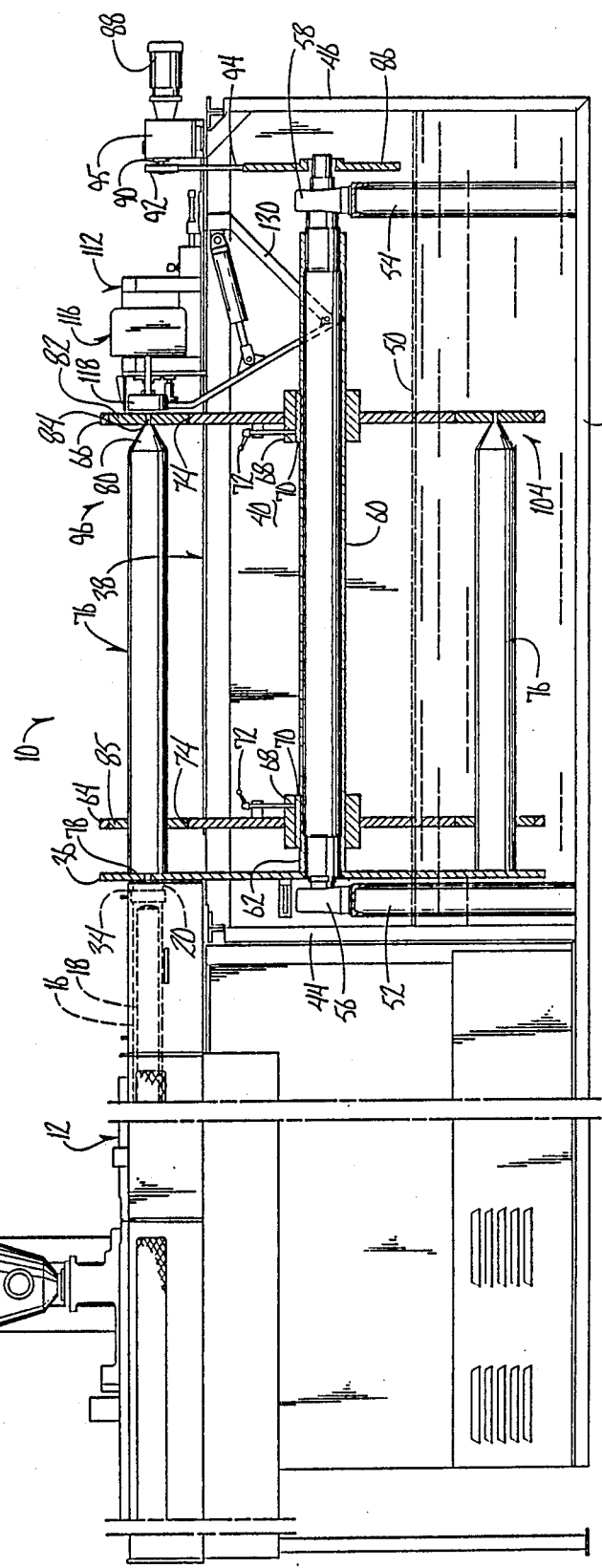

METHOD FOR RECYCLING A BEVERAGE CONTAINER

BACKGROUND OF THE INVENTION

The present invention relates to a product made from recycled beverage containers and a method for making the product.

Plastic beverage containers have recently become widely used which are constructed of a basic container body made from PET (Polyethylene Terephthalate) commonly called polyester. This is a thermal plastic material produced by reacting ethylene, glycol, and either terephalic acid or dimethyl terephthalate. These beverage containers also include a base cup attached to the bottom of the PET body. The base cup is made of high density polyethylene (HDPE) which is attached to the PET body member by a suitable adhesive. The plastic container also often has a paper or plastic label on its outer surface as well as a paper wad or gasket within the aluminum cap.

Present methods for recycling these bottles involve initially removing the cap from the PET container, then removing the high density polyethylene plastic base cup from each bottle. The PET bottles are then washed with a solution that removes paper, adhesive and other coatings which are on the PET container. The various components are then recycled separately.

Therefore, a primary object of the present invention is the provision of a product which can be manufactured from the bottle in its entirety, including the aluminum cap, the PET body, the HDPE base cup and adhesives and paper which also appear on the bottle.

A further object of the present invention is the provision of a device which can be manufactured easily from these entire containers, and which can produce products which are commercially useful and salable.

A further object of the present invention is the provision of a method which can utilize present equipment for processing the container in its entirety.

A further object of the present invention is the provision of a method which is economical and efficient in operation.

SUMMARY OF THE INVENTION

The present invention involves the processing of the plastic container in its entirety, including the HDPE base cup, the paper labels and wads, the PET base container, and the aluminum cap, as well as other items which may be attached to the container.

The process involves grinding the entire bottle into granules or particles which will readily flow in a plastics molding machine. A range of sizes is acceptable for these particles, but preferably they should be small enough to pass a ⅜ inch screen.

After granulation, the ground bottles are processed through a molding machine comprising a crammer feeding hopper which directly feeds into a plasticizing machine, typically an extruder. This machine fills molds at relatively low pressures. The pressure at filling is between 300 and 1000 psi with a preferred range between 400 and 700 psi. The molding machine also applies temperatures to the material and these are typically in the range of from 250 to 275° C. Once filled, the molds are allowed to cool either in the atmosphere or in a water bath or shower.

One problem encountered with untreated consumer bottles is the presence of water and other organic materials in the bottles. When processed through a molding machine, the water can produce large voids by the creation of steam. To avoid the formation of large voids, a nucleating system can be added to the mix prior to the time it is introduced to the molding machine for the purpose of providing centers for the steam to expand around and thereby produce a fine matrix of voids. The voids within this fine matrix are substantially smaller and more evenly dispersed than would be encountered in the absence of the introduction of a nucleating system. An example of a nucleating agent which will work with the present invention is sodium bicarbonate which decomposes to provide water and carbon dioxide distributed throughout the mass of the molding material. This causes nucleating of any steam expansion from water which is entrained in the mixture. Other nucleating systems such as a mixture of sodium bicarbonate and citric acid can be used. The addition of the nucleating agent takes place before the material is added to the crammer hopper and is typically added at a rate of between 0.1% and 1%.

The present invention is unlike other recovery processes for bottles because none of the components of the bottle are separated prior to grinding or molding. The products made from the present invention include such items as fence posts or other elongated solid members which can be use in numerous applications.

The present process is substantially less expensive and involves substantially fewer steps than presently known methods of recycling these PET bottles.

BRIEF DESCRIPTION OF THE DRAWINGS

FIG. 1 illustrates a typical PET container which is recycled with the present invention.

FIG. 2 illustrates a molding machine which can be used in the recycling process of the present invention.

DETAILED DESCRIPTION OF THE PREFERRED EMBODIMENT

Referring to the drawings, the numeral 200 refers to a plastic container comprising a hollow PET body member 202 having a paper label 204 extending therearound. Label 204 is attached by a suitable adhesive to the body 202. An aluminum cap 206 is threaded over the top of the bottle and often these threaded caps include paper or paperboard wads therein to form a seal with the top of the bottle. A base cup 208 is suitably attached to the bottom of the body 202 and this base cup 208 is usually constructed of high density polyethylene (HDPE). A suitable adhesive attaches cup 208 to body 202.

In present methods for recycling the bottle 200, the cap 206 is first removed. Then the base cup 208 is removed and the bottle is washed to remove the paper label 204 and other foreign materials within or on the outside of the body 202. The PET bottle is then recycled separately from the aluminum and from the HDPE of cup 208.

The present invention greatly simplifies the method for recycling the bottle by merely grinding the entire bottle, including the cap 206, the PET body 202, the label 204, and the HDPE cup 208. These materials are ground together into a particulate material having a size which preferably will pass a ⅜ inch screen. The primary requisite of this granulated material is that it should be capable of being fed into the hopper of a molding machine.

Before introducing the ground particles to the molding machine, a nucleating agent is added to the mixture of particles. The nucleating agent is preferably sodium bicarbonate added at a rate of between 0.1% and 1%. Another nucleating agent which will work is a mixture of sodium bicarbonate and citric acid. These nucleating agents avoid the formation of large voids by providing centers for the steam within the mixture to expand around and so produce a fine matrix of voids.

The granulated material with the nucleating agent added is introduced into a hopper 14 of an extruding machine 10. FIG. 2 illustrates a typical extruding machine which can be used to produce the products of the present invention. However, other types of molding or extruding machines could be used without detracting from the invention.

Referring to the drawings, the numeral 10 generally designates the molding machine. Machine 10 includes a screw extruding machine 12. Any commercially available extruder for processing polyethylene will work satisfactorily with the present invention. Extruding machine 12 includes an input hopper 14 for adding the comminuted plastic waste materials which will be extruded through the machine. Extruder 12 includes an extruding barrel 16 having a screw 18 therein for driving the plastic material toward the discharge end of the barrel. At the discharge end of the barrel is a nozzle 20.

The nozzle has the function of generating a pressure in the extruder so as to insure complete mixing of the various components of the input material. Furthermore, the nozzle enables the molds to be filled from a relatively small orifice so as to allow the molds to be of a relatively small cross-sectional area when compared with the extruder barrel diameter.

A nozzle heater band 34 surrounds nozzle 20 and is adapted to permit thermostatic control of the temperature of the extruded material, thereby maintaining the material at a constant temperature to obtain the desired flow properties at the nozzle head.

The nozzle is bolted or otherwise operatively secured to a large circular fixed plate 36 which remains stationary with respect to the extruder machine 12. Also attached to the extruding machine 12 is a rectangular tank 38 having side walls 40, end walls 44, 46, and a bottom wall 48. Tank 38 is adapted to hold a water bath or other cooling fluid 50 therein.

Mounted in the bottom of tank 38 are a pair of upstanding pedestals 52, 54 which include bearings 56, 58 at their upper ends for rotatably receiving a tubular shaft 60 therein. Shaft 60 extends rotatably in bearings 56, 58 and also extends rotatably through a sleeve 62 centrally located in circular plate 36.

Mounted on the outside of shaft 60 are a pair of spaced apart carousel plates 64, 66. Each plate 64, 66 includes a cylindrical sleeve 68 having a bushing 70 therein. Threaded within sleeves 68 are tightening rods 72 which are adapted to tighten against bushings 70 so as to clamp plates 64, 66 against sliding movement along shaft 70. The distance between plates 64, 66 may be adjusted by loosening rods 72 and by sliding the plates 64, 66 to the desired relative spaced apart positions.

Each plate 64, 66 includes a plurality of circular openings 74 therein. Mounted within openings 74 and spanning the distance between carousel plates 64, 66 are a plurality of elongated molds 76. Each mold includes a first open end 78 and a second closed end 80. Fitted over end 80 is a closure plate 82 having an efflux orifice 84 therein for permitting gases to escape as the mold is being filled. Closure plate 82 is circular and is retentively fitted within the circular opening 74 of carousel plate 66. Open end 78 of mold 76 is fitted against circular plate 36. Welded or otherwise secured to the outer surface of mold 76 is a circular plate 85 which is sized to fit retentively within the opening 74 of carousel plate 64. Thus molds 76 are suspended between carousel plates 64, 66 by means of closure plate 82 and circular plate 85 being fitted within the openings 74 of carousel plates 64, 66. The particular means for holding circular plates 82, 85 in openings 74 may vary, and may include clamps, set screws, or other means so as to attach the molds to the carousel plates 64, 66.

Mounted on the end of shaft 60 is a pulley 86. A drive motor 88 includes an output shaft 90 having a pulley 92 thereon. A belt 94 is trained around pulley 92 and pulley 86 so as to provide driving connection between motor 88 and shaft 60, thereby providing means for rotating the shaft 60 and the carousel plates 64, 66. A control box 95 is adapted to control motor 88 so as to cause the carousel plates 64, 66 to be moved in increments one at a time which will cause the various molds to move one at a time to nozzle 20.

Mounted for sliding movement on the upper edges of side walls 40 of tank 38 is a sliding frame 112 spanning the distance between side walls 40, 42. Fixed to frame 112 is a fill sensing assembly 116 which includes a fill sensing box 118 positioned in facing relationship to carousel plate 66. Fill sensing box 118 is adapted to sense molding material exiting from efflux orifice 84.

Upon actuation of the screw extruding machine, plastic material is extruded outwardly through nozzle 20 into mold 76. As the plastic material begins filling the mold 76, it ultimately begins issuing outwardly through efflux orifice 84. When this happens, the fill sensing box 118 stops the extruder and causes motor 88 to index and move plates 64, 66 so that a new mold 76 moves to nozzle 20.

A sprue cutting device 130 includes a knife blade (not shown) which is adapted to trim any resin that has issued from the orifice 84 of the mold. As the mold rotates with plates 64, 66, the knife of the sprue cutting device 130 wipes along the surface of closure plate 82 and trims the mold flush with the end face.

At the same time, the mold immediately following mold 76 is now at the nozzle 20 and is being filled. With the next indexing of the carousel plates, the second mold is trimmed and the first mold progresses downwardly toward the bath 50 within tank 38. By this time, the plastic material has hardened within mold 76 and does not require closure at the opposite ends of the mold 76.

After the molds have been more thoroughly cooled by subjecting them to the cooling bath 50, they can be emptied and used again for the forming of additional products.

The products made by molding according to the present invention are solid and strong in construction and can be used for such items as fence posts or members for constructing various types of structures. The process is quite simple and eliminates many of the steps previously contained in prior recycling methods.

Thus, it can be seen that the device accomplishes at least all of its stated objectives.

What is claimed is:

1. A method for recycling a beverage container comprising at least a PET body having a metal cap attached thereto, said method comprising:

grinding said entire beverage container, including said body and said metal cap into particles sufficiently small to flow into a screw extruder molding machine;

feeding all of said ground particles from said entire container into said screw extruder molding machine;

applying heat and pressure to said ground particles within said screw extruder molding machine whereby said screw extruder molding machine will convert said ground particles into a softened plastic flowable material capable of being molded and comprising a heterogeneous mixture of at least all of said PET and all of said metal of said cap;

forcing said plastic flowable material formed from said entire beverage container from said screw extruder molding machine into a mold of predetermined shape at a mold filling pressure of from 300 p.s.i. to 1,000 p.s.i whereby said flowable material will assume said predetermined shape of said mold;

cooling said plastic flowable material within said mold whereby said plastic flowable material will harden and form a solid object having said predetermined shape.

2. A method for recycling a beverage container comprising at least a PET body having a base cup attached thereto, said base cup being made of a second plastic different from said PET body, said method comprising;

. grinding said entire beverage container, including said body and said base cup, into particles sufficiently small to flow into a screw extruder molding machine;

feeding all of said ground particles from said entire container into said screw extruder molding machine;

applying heat and pressure to said ground particles within said screw extruder molding machine whereby said screw extruder molding machine will convert said ground particles from said entire container into a softened plastic flowable material capable of being molded and comprising a heterogeneous mixture of at least all of said PET and all of said second plastic;

forcing said plastic flowable material from said molding machine into a mold of predetermined shape at a mold filling pressure of from 300 p.s.i. to 1,000 p.s.i. whereby said flowable material will assume said predetermined shape of said mold;

cooling said plastic flowable material within said mold whereby said plastic flowable material will harden and form a solid object having said predetermined shape.

3. A method according to claim 2 wherein said container further includes a metal cap attached to said body, said method comprising grinding said entire beverage container, including said metal cap, into said particles whereby said ground particles fed into said molding machine and forced into said mold will include at least all of, said PET, all of said second plastic, and all of said metal of said cap.

4. A method according to claim 3 wherein said container further includes a paper wad within said cap and a paper label attached to said body, said method comprising grinding said entire beverage container including said paper wad and said paper label into said particles whereby said ground particles fed into said molding machine and forced into said mold will include at least all of said PET, all of said second plastic, all of said metal of said cap, and all of said paper of said wad and said label.

5. A method according to claim 1 or 2 comprising mixing a nucleating agent into said ground particles before feeding said particles into said molding machine, whereby said nucleating agent will minimize the formation of large voids formed by steam within said mixture and will instead cause the formation of a fine matrix of voids which are smaller than would be formed without the addition of said nucleating agent.

6. A method according to claim 1 or 2 comprising adding a nucleating agent to said ground particles before said particles are fed into said molding machine whereby said nucleating agent is selected from the group consisting essentially of sodium bicarbonate and a mixture of sodium bicarbonate and citric acid.

7. A method according to claim 1 or 2 comprising adding a nucleating agent of from 0.1% to 1% to said ground particles before said particles are fed to said molding machine.

8. A method according to claim 1 or 2 comprising grinding said particles to a size capable of passing through a ⅜ inch screen.

9. A method according to claim 1 or 2 wherein said molding machine heats said ground particles to from 250° C. to 275° C.

10. A method according to claim 2 wherein said forcing of plastic flowable material from said screw extruder machine into a mold is accomplished at a mold filling pressure of from 400 to 700 p.s.i.

11. A method according to claim 1 wherein said forcing of plastic flowable material from said screw extruder machine into a mold is accomplished at a mold filling pressure of from 400 to 700 p.s.i.

* * * * *